(12) United States Patent
Kim et al.

(10) Patent No.: US 7,929,620 B2
(45) Date of Patent: Apr. 19, 2011

(54) BLIND CHANNEL ESTIMATION IN AN ORTHOGONAL FREQUENCY DIVISION MULTIPLEXING SYSTEM

(75) Inventors: Tae Joon Kim, Seoul (KR); Ik Soo Eo, Daejeon (KR); Hee Bum Jung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1122 days.

(21) Appl. No.: 11/634,276

(22) Filed: Dec. 5, 2006

(65) Prior Publication Data

US 2007/0133700 A1    Jun. 14, 2007

(30) Foreign Application Priority Data

Dec. 8, 2005   (KR) ........................ 10-2005-0119519
Jul. 25, 2006   (KR) ........................ 10-2006-0069472

(51) Int. Cl.
*H04L 27/28* (2006.01)
*H04J 11/00* (2006.01)

(52) U.S. Cl. ........ 375/260; 375/259; 370/203; 370/206; 370/208; 370/210

(58) Field of Classification Search .................. 375/260; 370/344, 210, 203; 378/464; 341/180
See application file for complete search history.

(56) References Cited

U.S. PATENT DOCUMENTS

| | | | |
|---|---|---|---|
| 6,650,653 B1 | 11/2003 | Horng et al. | |
| 6,782,042 B1 * | 8/2004 | Celebi | 375/222 |
| 6,983,029 B2 * | 1/2006 | Alavi et al. | 375/329 |
| 7,355,958 B2 * | 4/2008 | Chen | 370/203 |
| 7,450,490 B2 * | 11/2008 | Muck et al. | 370/208 |
| 2003/0007576 A1 | 1/2003 | Alavi et al. | |
| 2004/0076112 A1 | 4/2004 | Chen | |
| 2005/0002461 A1 * | 1/2005 | Giannakis et al. | 375/259 |
| 2005/0157801 A1 * | 7/2005 | Gore et al. | 375/260 |
| 2006/0120275 A1 * | 6/2006 | Muck et al. | 370/210 |
| 2008/0043857 A1 * | 2/2008 | Ribeiro Dias et al. | 375/260 |

FOREIGN PATENT DOCUMENTS

WO    WO 2004-064344    7/2004

OTHER PUBLICATIONS

Muquet, B., et al., "Blind and Semi-Blind Channel Identification Methods Using Second Order Statistics For OFDM Systems." 1999. IEEE 0-7803-5041-3/99, pp. 2745-2748.
Bertrand Muquet et al "Subspace-Based Blind and Semi-Blind Channel Estimation for OFDM Systems." Jul. 2002, IEEE Transactions on Signal Processing, vol. 50, No. 7.

* cited by examiner

*Primary Examiner* — Chieh M Fan
*Assistant Examiner* — Eboni Giles
(74) *Attorney, Agent, or Firm* — Ladas & Parry LLP (57) ABSTRACT

A method for stable channel estimation to increase frequency band efficiency that is lost by using a pilot, and to reduce the complexity and the sensitivity to channel zero. The method includes generating an i-th symbol block $S_i$ including N carriers, performing an inverse fast Fourier transform (IFFT) operation on the i-th symbol block, and forming an orthogonal frequency division multiplexing (OFDM) symbol block. The method also includes attaching a guard interval sample in front of the i-th OFDM symbol block $U_i$ and forming at least one OFDM symbol block $U_{i,cp}$. The method further includes modeling the formed OFDM symbol block $U_{i,cp}$ with a channel finite impulse response (FIR) filter and estimating channel impulse response using signals yi received through a channel.

19 Claims, 4 Drawing Sheets

$$H = \begin{bmatrix} 0 & h_{L-1} & h_{L-2} & \cdots & h_0 & 0 & \rightarrow & & & & 0 \\ 0 & 0 & h_{L-1} & h_{L-2} & \cdots & h_0 & 0 & \rightarrow & & & 0 \\ 0 & 0 & 0 & h_{L-1} & h_{L-2} & \cdots & h_0 & 0 & \rightarrow & & 0 \\ \downarrow & \downarrow & \downarrow & & & & \searrow & \searrow & & \searrow & \\ \downarrow & \downarrow & & & & & \searrow & \searrow & & & 0 \\ 0 & 0 & 0 & \rightarrow & & 0 & h_{L-1} & h_{L-2} & \cdots & & h_0 \end{bmatrix}$$

width: $P+L$, height: $P$

FIG. 4

$$H_1 = \begin{bmatrix} h_0 & 0 & \longrightarrow & & 0 \\ h_1 & h_0 & 0 & & 0 \\ h_2 & h_1 & h_0 & \searrow & 0 \\ & & & \searrow & 0 \\ h_{L-1} & h_{L-2} & \cdots & & h_0 \end{bmatrix}$$

FIG. 5

$$H_2 = \begin{bmatrix} 0 & h_{L-1} & h_{L-2} & \cdots & & h_1 \\ 0 & 0 & h_{L-1} & \cdots & & h_2 \\ 0 & 0 & 0 & h_{L-1} & \cdots & h_3 \\ \downarrow & & & & \searrow & \searrow \\ 0 & 0 & 0 & \rightarrow & 0 & h_{L-1} \end{bmatrix}$$

FIG. 6

$$P = \begin{bmatrix} 0 & 0 & \rightarrow & & 0 \\ 1 & 0 & 0 & & 0 \\ 0 & 1 & 0 & \searrow & 0 \\ \vdots & \vdots & 1 & \searrow & 0 \\ 0 & 0 & \cdots & 1 & 0 \end{bmatrix}$$

BLIND CHANNEL ESTIMATION IN AN ORTHOGONAL FREQUENCY DIVISION MULTIPLEXING SYSTEM

CROSS-REFERENCE TO RELATED APPLICATION

This application claims priority to and the benefit of Korean Patent Application Nos. 2005-119519, filed Dec. 8, 2005, and 2006-69472, filed Jul. 25, 2006, the disclosures of which are incorporated herein by reference in their entirety.

BACKGROUND

1. Field of the Invention

The present invention relates to an orthogonal frequency division multiplexing (OFDM) system, and more particularly, to a method for blind channel estimation using a guard interval of a signal in the OFDM technique.

2. Discussion of Related Art

In order to provide telecommunication services in various forms such as voice and packet data, wireless communication systems are widely disposed. The systems may be multiple access systems that share available system resources to support communication with multiple users. A code division multiple access (CDMA) system, a time division multiple access (TDMA) system, and an orthogonal frequency division multiple access (OFDMA) system are examples of multiple access systems.

Here, the OFDM is a technique that separates data into several bit streams and modulates the bit streams using several carriers. More specifically, the OFDM technique converts a serial bit stream into a parallel bit stream and modulates and transmits the information using subcarriers of different frequencies. In comparison with a method transmitting data in sequence using one carrier, the OFDM technique has a longer interval between transmission signals and thus is less affected by a channel delay time. Also, the OFDM technique can reduce interference between successive signals and thus is strong for a multipath channel. In addition, the OFDM technique can increase spectrum efficiency and shows good bandwidth efficiency because high-speed transmission is possible.

Therefore, the OFDM technique is hardly affected by time delay of a multipath and thus does not require a time-domain equalizer. In addition, the OFDM technique can eliminate interference between signals by inserting guard intervals.

In general, according to the OFDM technique, when there is no adjacent signal interference or adjacent channel interference caused by distortion of a transmission channel, orthogonality between subchannels is maintained, and each subchannel is completely separated by a fast Fourier transform (FFT) operation at a receiving end.

However, since a spectrum of an OFDM signal is not a limited band in actuality, energy of each subchannel is transferred to an adjacent channel due to linearity distortion such as multipath. Thus, adjacent signal interference is caused. While this problem can in theory be solved by increasing the number of carriers or a signal period, in practice this is difficult due to carrier stability, Doppler shift, and FFT size. Thus, instead, guard intervals are inserted into an OFDM signal.

Figure 1:
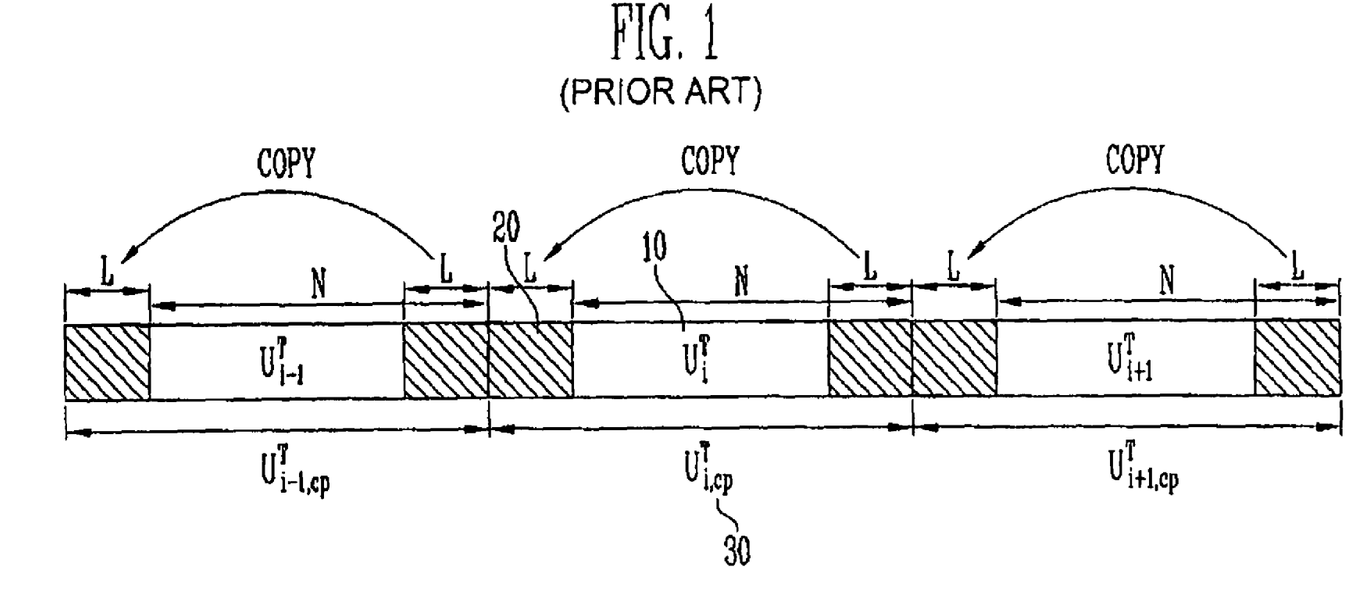
FIG. 1 is a diagram illustrating a method for estimating a channel by inserting a cyclic prefix into a guard interval in an orthogonal frequency division multiplexing (OFDM) system.

FIG. 1 is a diagram illustrating a method for estimating a blind channel by inserting guard intervals into an OFDM system according to conventional art. Each OFDM symbol consists of two parts, i.e., an actual signal interval 10 and a guard interval 20. Here, the guard interval 20 is made by attaching an end part of a signal to a beginning part thereof.

Referring to FIG. 1, assuming that a k-th carrier in an i-th symbol block is $s_i(k)$ in OFDM signal transmission, an i-th symbol block consisting of N carriers is expressed by a column vector $\underline{s_i}=[s_i(0), \ldots, s_i(N-1)]^T$.

Here, each symbol $s_i(k)$ is statistically uncorrelated with the others as in most known modulation methods (binary phase shift keying (BPSK), phase shift keying (PSK), quadrature amplitude modulation (QAM), differential phase shift keying (DPSK), and so on), independent of the others, identically distributed, and has a zero average and a variance of 1.

Here, in the OFDM system, the i-th symbol block $\underline{s_i}$ is modulated into a time-domain signal 10 by an N-point inverse fast Fourier transform (IFFT) operation. The time-domain signal 10 is expressed by the following Formula 1.

$$\underline{u_i} = [u_i(0), \ldots, u_i(N-1)]^T = F_N^H \underline{s_i} \qquad \text{Formula 1}$$

In Formula 1, $F_N$ denotes an N-point FFT matrix in which each element equals $$\frac{1}{\sqrt{N}} e^{-j2\pi nk/N}$$

(n: row index, k: column index), and $[\bullet]^H = ([\bullet]^T)^*$.

Then, L guard interval samples 20 (prefix) are attached in front of an i-th OFDM symbol block $\underline{u_i}$ by copy, and thus P (=L+N) number of OFDM symbol blocks $\underline{u_{i,cp}}$ 30 are formed. Here, the samples within the guard intervals satisfy the following Formula 2.

$$\underline{u_{i,cp}}(-L+n) = \underline{u_{i,cp}}(N-L+n), n=0, \ldots, L-1 \qquad \text{Formula 2}$$

However, the OFDM system has come to use a pilot for channel estimation, resulting in deterioration of frequency band efficiency. For example, among channel allocation methods of Institute of Electrical and Electronics Engineers (IEEE) 802.16e, for which standardization has recently been completed, a partial usage of subchannels (PUSC) scheme uses one pilot per six carriers to obtain desired performance, thus deteriorating system efficiency.

Since the number of pilots increases in proportion to a desired throughput, frequency band efficiency consequently undergoes severe deterioration.

Therefore, blind channel estimation algorithms are proposed as a method for increasing frequency band efficiency, the blind channel estimation algorithms estimating a channel not by using a pilot but by using an inserted cyclic prefix within a guard interval repeated in OFDM symbol blocks.

The above-described blind channel estimation methods according to conventional art have the following problems.

First, the blind channel estimation methods that have been disclosed so far are very sensitive to channel zero and have unstable characteristics. Thus, stable, high-accuracy channel estimation is not possible.

Second, since a somewhat stable and accurate blind channel estimation method would be exceedingly complex, such a method would be difficult to practically apply to blind channel estimation.

SUMMARY OF THE INVENTION

The present invention is directed to a stable channel estimation method increasing frequency band efficiency, which is deteriorated by using a pilot, and reducing complexity and sensitivity to channel zero.

The present invention is also directed to a method for directly estimating a channel from two cross matrixes obtained using a cyclic prefix of a guard interval, to increase a degree of freedom for channel zero.

The present invention is also directed to a method of stably estimating impulse response of a channel using equal gain combining and singular value decomposition (SVD) on a rank-one matrix without the influence of channel zero.

One aspect of the present invention provides a method for blind channel estimation, comprising the steps of: (a) generating an i-th symbol block $S_i$ including N carriers; (b) performing an inverse fast Fourier transform (IFFT) operation on the i-th symbol block and forming an orthogonal frequency division multiplexing (OFDM) symbol block; (c) attaching a guard interval sample in front of the i-th OFDM symbol block $U_i$ and forming at least one OFDM symbol block $U_{i,cp}$; and (d) modeling the formed OFDM symbol block $U_{i,cp}$ with a channel finite impulse response (FIR) filter h and noise v and estimating channel impulse response using signals yi received through a channel.

Step (b) may be performed by applying the following Formula 1:

$$\underline{u_i} = [u_i(0), \ldots, u_i(N-1)]^T = F_n^H \underline{s_i} \quad \text{Formula 1}$$

In step (c), P (=L+N) number of OFDM symbol blocks $U_{i,cp}$ may be formed, and p=qL and N=(q−1)L (q is a positive integer larger than 2).

The signals yi received in step (d) may be defined by the following Formula 4:

$$\underline{y_i} = H[\underline{u}^T_{i-1,q-1} \underline{u}^T_{i,cp}]^T + \underline{v_i} \quad \text{Formula 4}$$

The channel matrix H may be an upper or lower triangular Toeplitz matrix having a size of P×(P+L).

The length of the guard interval may be designed to be longer than the length of the channel.

The guard interval may be a vector having a length of 2 L and defined by signals generated by the following Formula 5 and 6:

$$\underline{g_{i,0}}(0) = [\underline{u}^T_{i-1,q-1} \underline{u}^T_{i,0}]^T$$

$$\underline{g_{i,0}}(L-1) = [u_{i-1,q-1}(L-1)\underline{u}^T_{i,0} u_{i,1}(0) \ldots u_{i,1}(L-2)]^T \quad \text{Formula 5}$$

and $$\underline{g_{i,q-1}}(0) = [\underline{u}^T_{i,q-2} \underline{u}^T_{i,q-1}]^T$$

$$\underline{g_{i,q-1}}(L-1) = [u_{i,q-2}(L-1)\underline{u}^T_{i,q-1} u_{i+1,0}(0) \ldots u_{i+1,0}(L-2)]^T \quad \text{Formula 6}$$

In step (d), the signals generated by Formulae 5 and 6 may pass through the channel and be defined by the following Formula 7:

$$\underline{y_{i,0}}(d) = [H_2 H_1]\underline{g_{i,0}}(d) + [v_i(d) \ldots v_i(d+L-1)]^T$$

$$\underline{y_{i,q-1}}(d) = [H_2 H_1]\underline{g_{i,q-1}}(d) + [v_i((q-1)L+d) \ldots v_i(qL-1+d)]^T \quad \text{Formula 7}$$

and the channel impulse response may be estimated.

The channel impulse response may be estimated by a cross-correlation matrix obtained by performing cross-correlation on the signals defined by Formula 7.

The cross-correlation matrix $R_0$ may be obtained by the following Formula 8:

$$R_0 = E\{\underline{y_{i,0}}(0)\underline{y_{i,q-1}}(0)^H\}$$
$$= H_1 E\{\underline{u_{i,0}} \underline{u}^H_{i,q-1}\} H_1^H$$
$$= H_1 H_1^H \quad \text{Formula 8}$$

The cross-correlation matrix $R_0$ may be obtained by the following Formula 9:

$$R_{q-1} = E\{\underline{y_{i,0}}(L-1)\underline{y_{i,q-1}}(L-1)^H\}$$
$$= [H_2 P \ H_1 \underline{e_1}] E\{\underline{u_{i,0}} \underline{u}^H_{i,q-1}\} [H_2 P \ H_1 \underline{e_1}]^H \quad \text{Formula 9}$$

The unit column vector $e_1$ may have a first element that is 1 and other elements that are all 0.

Step (d) may include the steps of: (d1) calculating cross-correlations on the signals yi received through the channel; (d2) performing equal gain combining on the calculated cross-correlations and detecting at least two singular vectors by a rank-one matrix; (d3) performing singular value decomposition (SVD) on the obtained rank-one matrix and detecting the largest singular vector; and (d4) identifying a phase using a differential modulation method or one pilot carrier on the detected unit vector and estimating the channel impulse response.

In step (d1), the cross-correlations may be calculated using the following Formula 10:

$$R_0 \approx \frac{1}{B} \sum_{i=0}^{B-1} \underline{y_{i,0}}(0) \underline{y_{i,q-1}}(0)^H$$

$$R_{q-1} \approx \frac{1}{B} \sum_{i=0}^{B-1} \underline{y_{i,0}}(L-1) \underline{y_{i,q-1}}(L-1)^H \quad \text{Formula 10}$$

In step (d2), the rank-one matrix H may be obtained using the following Formula 19:

$$\hat{h}\hat{h}^H = \frac{R_{0,h} + R_{q-1,h}}{2} \quad \text{Formula 19}$$

Step (d2) may include the steps of: directly calculating a first estimated singular vector from a first column of a matrix $R_0$ of the calculated cross-correlations; and directly calculating a second estimated singular vector from a last row of a matrix $R_{q-1}$ of the calculated cross-correlations.

The first estimated unit vector may be calculated by the following Formulae 11 and 12:

$$1st \text{ column of } R_0 = \underline{r_1} = ([h_0 \ h_1 \ \ldots \ h_{L-1}]h_0^*)^T \quad \text{Formula 11}$$

and $$\hat{h}_1 = \frac{\underline{r_1}}{\sqrt{\text{first element of } \underline{r_1}}} \quad \text{Formula 12}$$

The second estimated unit vector may be calculated by the following Formulae 13 and 14:

$$\text{last row of } R_{q-1} = \overline{r_L} = h_{L-1}[\, h_0^* \quad h_1^* \quad \ldots \quad h_{L-1}^* \,] \quad \text{Formula 13}$$

and $$\hat{h}_2 = \left( \frac{\overline{r_L}}{\sqrt{\text{first element of } \overline{r_L}}} \right)^H \quad \text{Formula 14}$$

When $h_0$, $h_{q-1}$ satisfies $h_0, h_{q-1} \neq 0$ and $h_0, h_{q-1} \gg 0$, the equal gain combining may be performed by the following Formula 15:

$$\hat{h} = \frac{\hat{h}_1 + \hat{h}_2}{2} = \left( \frac{h_0^*/|h_0| + h_{L-1}^*/|h_{L-1}|}{2} \right)[\, h_0 \quad h_1 \quad \ldots \quad h_{L-1} \,] \quad \text{Formula 15}$$

In step (d3), the largest singular vector may be detected by at least two iterations of an SVD algorithm.

Step (d) may include the steps of: calculating cross-correlations on the signals yi received through the channel; detecting a singular vector by a lower Toeplitz matrix obtained by performing Cholesky factorization on the calculated cross-correlations; and identifying a phase using a differential modulation method or one pilot carrier on the detected unit vector and estimating the channel impulse response.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF EXEMPLARY EMBODIMENTS

Hereinafter, exemplary embodiments of the present invention will be described in detail. However, the present invention is not limited to the exemplary embodiments disclosed below and can be implemented in various forms. Therefore, the present exemplary embodiments are provided for complete disclosure of the present invention and to fully convey the scope of the present invention to those of ordinary skill in the art.

A method for blind channel estimation using a guard interval of a signal in an orthogonal frequency division multiplexing (OFDM) system according to an exemplary embodiment of the present invention will be described with reference to the appended drawings. Here, as illustrated in FIG. 1, the length of a guard interval in an actual OFDM system is generally defined as the total fast Fourier transform (FFT) length N divided by an integer (N/a, a is an integer). Therefore, for ease of description, the present invention assumes that p=qL and N=(q−1)L (q is a positive integer larger than 2).

Figure 2:
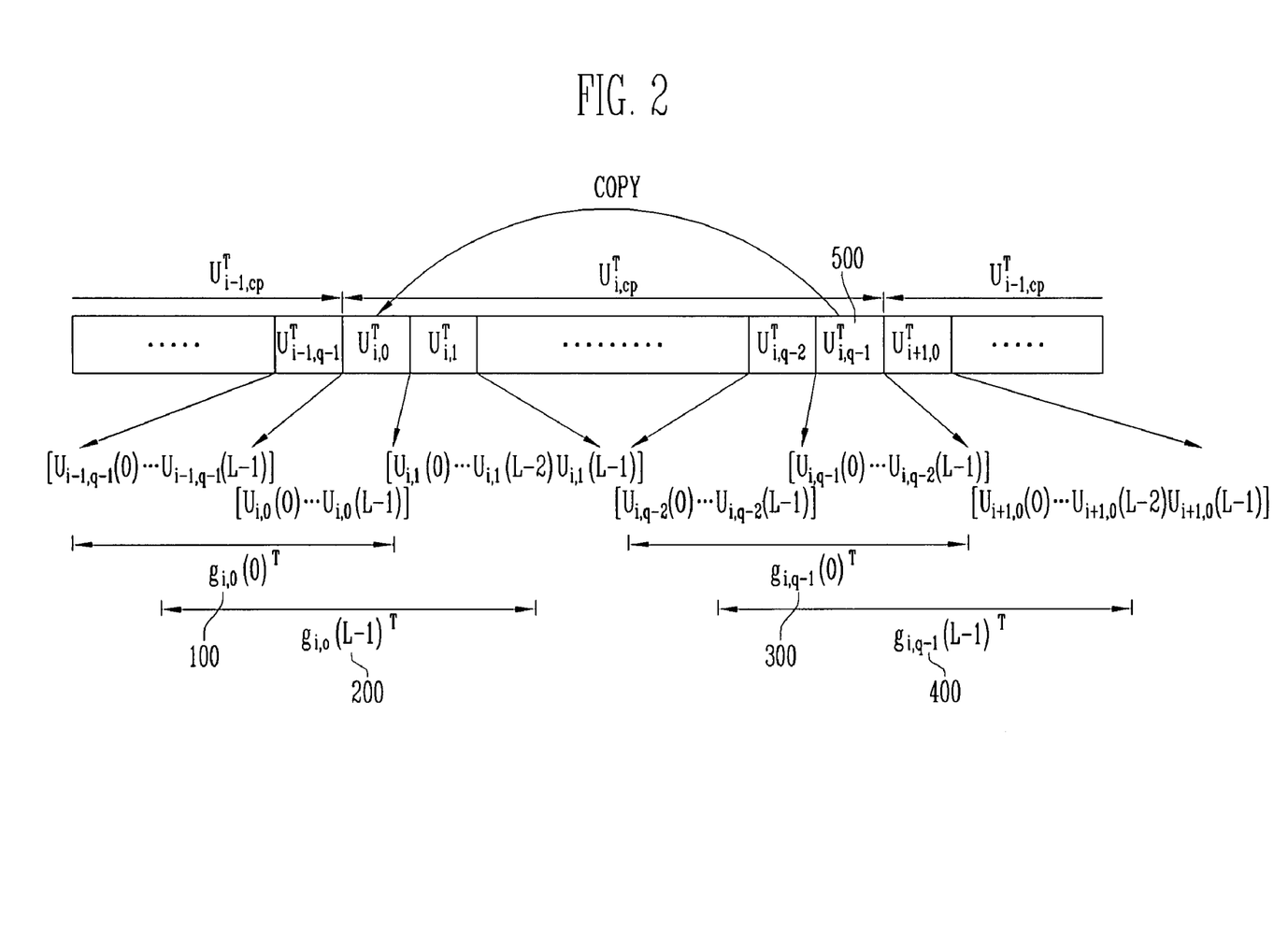
FIG. 2 is a diagram illustrating a method for estimating a channel by inserting a cyclic prefix into a guard interval in an OFDM system according to an exemplary embodiment of the present invention.

In this connection, $u_i$ 30 of FIG. 1 can be divided into a total number q of sub-blocks each having a length of L, as defined by the following Formula 3, which is illustrated in FIG. 2.

$$\underline{u_{i,cp}}^T = [\underline{u_{i,0}}^T \ldots \underline{u_{i,q-1}}^T]^T$$

$$\underline{u_{i,b}}^T = [u_i(bL) \ldots u_i(bL+L-1)]^T, \ b=0, \ldots, q-1 \quad \text{Formula 3}$$

Since a guard interval is generated by cyclic prefixing in Formula 3, a sub-block $u_{i,0} = u_{i,q-1}$ 500.

In addition, a channel is modeled with a channel finite impulse response (FIR) filter $h = [h_0 \ldots h_{L-1}]^T$ and noise v.

Here, it is assumed that the length of the channel FIR is M, and the guard interval of the OFDM system is designed to be longer than the channel length, i.e., M≦L. This means $h_1=0$, $1 \geq M$.

Figure 3:
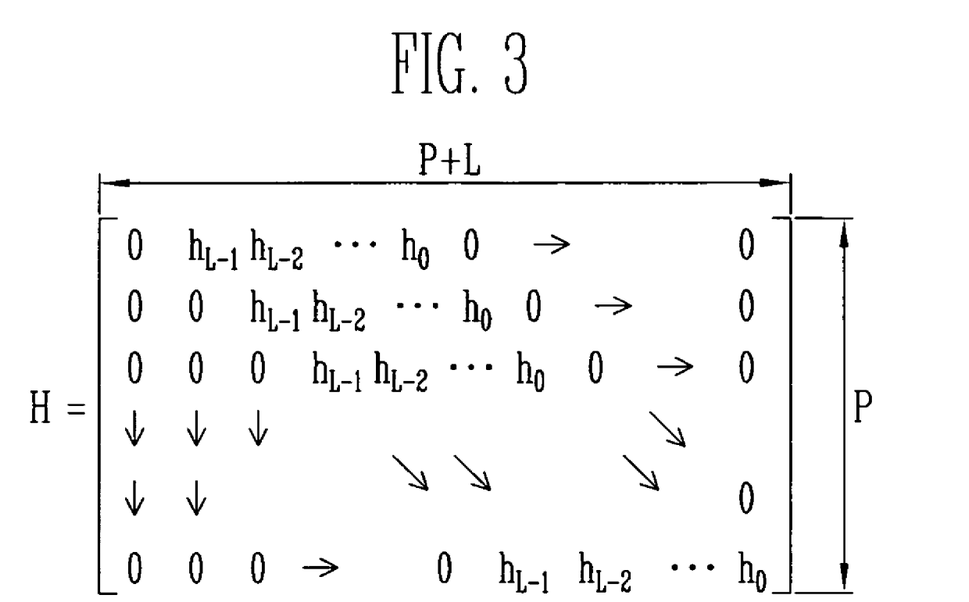
FIG. 3 illustrates a Toeplitz structure of a channel matrix within a guard interval in an OFDM system according to an exemplary embodiment of the present invention.

Therefore, the channel is a Toeplitz matrix having a size of P×(P+L) illustrated in FIG. 3, in which a first column corresponds to $[0 \ldots 0]^T$, and a first row corresponds to $[0 \ h_{L-1} \ldots h_0 \ 0 \ldots 0]$.

Consequently, an i-th block received through the channel may be expressed by the following Formula 4.

$$\underline{y_i} = H[\underline{u}^T_{i-1,q-1} \underline{u}^T_{i,cp}]^T + \underline{v_i} \quad \text{Formula 4}$$

In Formula 4, $u_{i-1,q-1}$ denotes a signal of a (q−1)th sub-block of an (i−1)th transmission block, $\underline{v_i} = [v_i(0) \ldots v_i(qL-1)]^T$ denotes an i-th block noise signal vector, and a sample $v_i(n)$ denotes complex Gaussian white noise having a zero average and variance of noise power $\sigma^2$.

Figure 4:
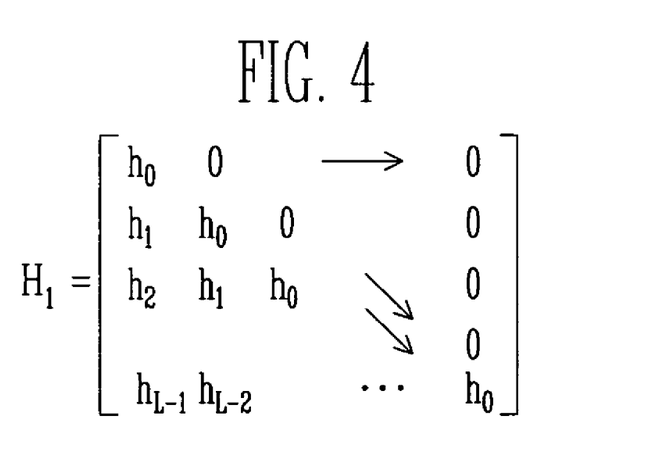
FIG. 4 illustrates the structure of a lower triangular Toeplitz matrix within a guard interval in an OFDM system according to an exemplary embodiment of the present invention.
Figure 5:
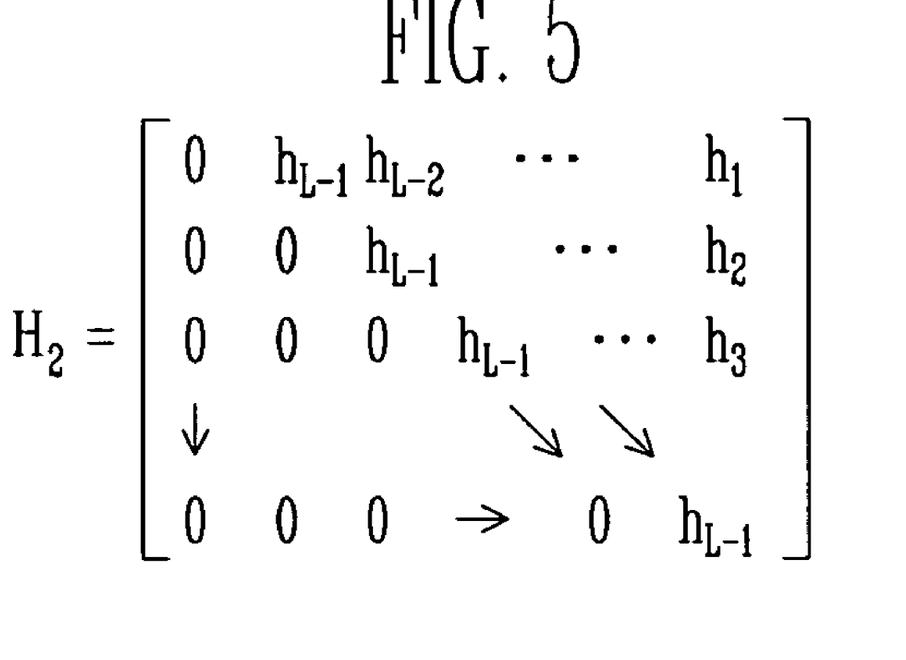
FIG. 5 illustrates the structure of a upper triangular Toeplitz matrix within a guard interval in an OFDM system according to an exemplary embodiment of the present invention.

The method for blind channel estimation proposed as described above fundamentally utilizes information on a guard interval repeated in an OFDM symbol block. To this end, a lower triangular Toeplitz matrix $H_1$ and an upper triangular Toeplitz matrix $H_2$ illustrated in FIGS. 4 and 5 are defined.

In addition, a vector having a guard interval length of 2 L is defined by signals 100 and 200 generated by the following Formula 5 to transmit the vector.

$$\underline{g_{i,0}}(0) = [\underline{u}^T_{i-1,q-1} \underline{u}^T_{i,0}]^T$$

$$\underline{g_{i,0}}(L-1) = [u_{i-1,q-1}(L-1)\underline{u}^T_{i,0} u_{i,1}(0) \ldots u_{i,1}(L-2)]^T \quad \text{Formula 5}$$

Likewise, signals 300 and 400 are generated by the following Formula 6.

$$\underline{g_{i,q-1}}(0) = [\underline{u}^T_{i,q-2} \underline{u}^T_{i,q-1}]^T$$

$$\underline{g_{i,q-1}}(L-1) = [u_{i,q-2}(L-1)\underline{u}^T_{i,q-1} u_{i+1,0}(0) \ldots u_{i+1,0}(L-2)]^T \quad \text{Formula 6}$$

The signals of Formulae 5 and 6 each pass through the channel and may be expressed by the following Formula 7 in case of d=0, L−1.

$$\underline{y_{i,0}}(d) = [H_2 H_1]\underline{g_{i,0}}(d) + [v_i(d) \ldots v_i(d+L-1)]^T$$

$$\underline{y_{i,q-1}}(d) = [H_2 H_1]\underline{g_{i,q-1}}(d) + [v_i((q-1)L+d) \ldots v_i(qL-1+d)]^T \quad \text{Formula 7}$$

The method for blind channel estimation is based on generating a correlation matrix by performing cross-correlation on $y_{i,0}(d)$ and $y_{i,q-1}(d)$. Assuming that a cross-correlation matrix is $R_0$ when d=0, and $R_{q-1}$ when d=q-1, expected values of the cross-correlation matrix obtained as a result of performing the cross-correlation may be expressed by the following Formulae 8 and 9.

$$R_0 = E\{y_{i,0}(0) y_{i,q-1}(0)^H\} \qquad \text{Formula 8}$$
$$= H_1 E\{u_{i,0} u_{i,q-1}^H\} H_1^H$$
$$= H_1 H_1^H$$

$$R_{q-1} = E\{y_{i,0}(L-1) y_{i,q-1}(L-1)^H\} \qquad \text{Formula 9}$$
$$= [H_2 P \ \ H_1 \underline{e_1}] E\{u_{i,0} u_{i,q-1}^H\} [H_2 P \ \ H_1 \underline{e_1}]^H$$

Figure 6:
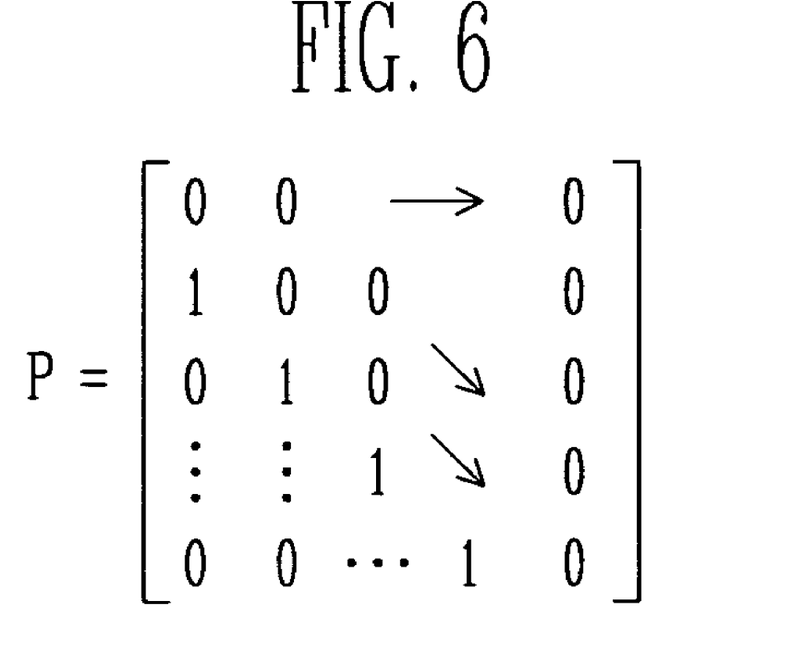
FIG. 6 illustrates the structure of a left shifting matrix within a guard interval in an OFDM system according to an exemplary embodiment of the present invention.

Here, P is a left shifting matrix having a size of L×L and is defined as illustrated in FIG. 6. In addition, $e_1$ is a unit column vector having a length of L, a first element that is 1, and other elements that are all 0.

As shown in Formulae 8 and 9, when a correlation matrix is generated by performing cross-correlation rather than auto-correlation, it can be seen that influence of noise power $\sigma^2$ is theoretically eliminated. Thus, the method becomes strong against noise due to the cross-correlation.

In practical application, $R_0$, $R_{q-1}$ can be estimated by averaging B symbol blocks as in the following Formula 10.

$$R_0 \approx \frac{1}{B} \sum_{i=0}^{B-1} \underline{y_{i,0}}(0) \underline{y_{i,q-1}}(0)^H \qquad \text{Formula 10}$$

$$R_{q-1} \approx \frac{1}{B} \sum_{i=0}^{B-1} \underline{y_{i,0}}(L-1) \underline{y_{i,q-1}}(L-1)^H$$

A variety of methods are available for estimating impulse response of the channel from $R_0$, $R_{q-1}$ given by Formula 10.

An estimated channel impulse value obtained by the following methods in the end is defined as ĥ.

The first method most simply estimates channel impulse response from given $R_0$, $R_{q-1}$. This includes a method of directly obtaining an estimation value $\hat{h}_1$ from the first column of $R_0$ and a method of directly obtaining an estimation value $\hat{h}_2$ from the last row of $R_{q-1}$. Since the first column of $R_0$ is defined by Formula 11, the method can estimate $\hat{h}_1$ by the following Formula 12 without specifying phase.

$$1st \text{ column of } R_0 = \underline{r_1} = ([h_0 \ \ h_1 \ \ \dots \ \ h_{L-1}] h_0^*)^T \qquad \text{Formula 11}$$

$$\hat{h}_1 = \frac{\underline{r_1}}{\sqrt{\text{first element of } \underline{r_1}}} \qquad \text{Formula 12}$$

Likewise, since the last row of $R_{q-1}$ is defined by Formula 13, the method can estimate $\hat{h}_2$ by the following Formula 14 without specifying phase.

$$\text{last row of } R_{q-1} = \overline{r_L} = h_{L-1}[h_0^* \ \ h_1^* \ \ \dots \ \ h_{L-1}^*] \qquad \text{Formula 13}$$

$$\hat{h}_2 = \left(\frac{\overline{r_L}}{\sqrt{\text{last element of } \overline{r_L}}}\right)^H \qquad \text{Formula 14}$$

The vagueness of a phase existing in Formulae 12 and 14 can be eliminated using a differential modulation method or one pilot carrier at a transmitting end.

Here, when the result of Formula 12 is combined with that of Formula 14, it is possible to further increase the accuracy of estimated channel impulse response.

Then, equal gain combining is performed on the results of Formulae 12 and 14, and a result corresponding to following Formula 15 can be obtained.

$$\hat{h} = \frac{\hat{h}_1 + \hat{h}_2}{2} = \left(\frac{\frac{h_0^*}{|h_0|} + \frac{h_{L-1}^*}{|h_{L-1}|}}{2}\right)[h_0 \ \ h_1 \ \ \dots \ \ h_{L-1}] \qquad \text{Formula 15}$$

However, the first method using Formulae 11 to 15 must satisfy the assumption that $h_0$, $h_{q-1}$ are not 0. In addition, when one of $h_0$, $h_{q-1}$ is almost 0, an error is greatly amplified while Formulae 12 and 14 are calculated. Consequently, inaccurate channel impulse response is estimated by Formula 15.

Therefore, the first method can be used when the following Formula 16 is satisfied.

$$h_0, h_{q-1} \neq 0 \text{ and } h_0, h_{q-1} \gg 0 \qquad \text{Formula 16}$$

When only $h_0$ satisfies Formula 16, the method according to Formulae 11 and 12 must be used, and when only $h_{q-1}$ satisfies Formula 16, the method according to Formulae 13 and 14 must be used.

Another available method obtains ĥ using Cholesky factorization.

Since $H_1$ is a lower triangular Toeplitz matrix as shown in FIG. 4, it is possible to easily estimate channel impulse response by Cholesky factorization of $R_0$.

More specifically, when the Cholesky factorization of $R_0$, which is approximately obtained by Formula 10, is performed, a lower triangular Toeplitz matrix $\hat{H}_1$ (estimated values for $H_1$) approximate to $H_1$ can be obtained. In this case, the first column of $\hat{H}_1$ is reflected in ĥ with unspecified phase. However, in order to apply Cholesky factorization, $R_0$ must be always positive definite.

Even when little noise exists in $R_0$, $R_0$ becomes non-positive definite, and thus Cholesky factorization diverges. Therefore, the Cholesky method cannot be used in actual systems.

The second method stably obtains an estimated channel value ĥ using $R_0$, $R_{q-1}$ at the same time. This requires neither the condition of Formula 16 nor the condition that $R_0$ must be positive definite.

The second method proposed by the present invention obtains ĥ by the following Formulae 17 and 18.

$$R_{0,h} = R_0 - PR_0 P^T \qquad \text{Formula 17}$$

$$R_{q-1,h} = R_{q-1} - P^T R_{q-1} P \qquad \text{Formula 18}$$

Then, it is possible to generate a matrix corresponding to the outer product of ĥ and $\hat{h}^H$ by performing equal gain combining on results obtained by Formulae 17 and 18 as shown in the following Formula 19. In other words, a rank-one matrix can be generated.

$$\hat{h}\hat{h}^H = \frac{R_{0,h} + R_{q-1,h}}{2} \quad \text{Formula 19}$$

In order to describe this method in detail, it is assumed that a j-th column of $H_1$ is $\underline{h}_j^1$ as shown in FIG. 4 and that a j-th column of $H_2$ is $\underline{h}_j^{q-1}$ as shown in FIG. 5.

Then, Formula 17 can be combined with Formula 8 to yield the following Formula 20.

$$R_{0,h} = [\underline{h}_0^0 \; \underline{h}_1^0 \; \underline{h}_2^0 \; \ldots \; \underline{h}_{L-1}^0][\underline{h}_0^0 \; \underline{h}_1^0 \; \underline{h}_2^0 \; \ldots \; \underline{h}_{L-1}^0]^H - \quad \text{Formula 20}$$

$$P[\underline{h}_0^0 \; \underline{h}_1^0 \; \underline{h}_2^0 \; \ldots \; \underline{h}_{L-1}^0][\underline{h}_0^0 \; \underline{h}_1^0 \; \underline{h}_2^0 \; \ldots \; \underline{h}_{L-1}^0]^H P^T$$

$$= \underline{h}_0^0 \underline{h}_0^{0H} + \underline{h}_1^0 \underline{h}_1^{0H} + \ldots + \underline{h}_{L-1}^0 \underline{h}_{L-1}^{0H} - P\underline{h}_0^0 \underline{h}_0^{0H} P^T -$$

$$P\underline{h}_1^0 \underline{h}_1^{0H} P^T - \ldots - P\underline{h}_{L-1}^0 \underline{h}_{L-1}^{0H} P^T$$

The following Formula 21 can be deduced from Formula 20.

$$P\underline{h}_0^0 \underline{h}_0^{0H} P^T = \underline{h}_1^0 \underline{h}_1^{0H} \quad \text{Formula 21}$$
$$P\underline{h}_1^0 \underline{h}_1^{0H} P^T = \underline{h}_2^0 \underline{h}_2^{0H}$$
$$\vdots = \vdots$$
$$P\underline{h}_{L-2}^0 \underline{h}_{L-2}^{0H} P^T = \underline{h}_{L-1}^0 \underline{h}_{L-1}^{0H}$$
$$P\underline{h}_{L-1}^0 \underline{h}_{L-1}^{0H} P^T = 0$$

Consequently, by applying Formula 21, only $\underline{h}_0^0 \underline{h}_0^{0H}$ remains in Formula 20.

In the same manner, Formula 18 can be combined with Formula 9 to yield the following Formula 22.

$$R_{q-1,h} = [h_1^{q-1} \; h_2^{q-1} \; h_3^{q-1} \; \ldots \; h_{L-1}^{q-1} \; h_0^0] \quad \text{Formula 22}$$
$$[h_1^{q-1} \; h_2^{q-1} \; h_3^{q-1} \; \ldots \; h_{L-1}^{q-1} \; h_0^0]^H -$$
$$P^T[h_1^{q-1} \; h_2^{q-1} \; h_3^{q-1} \; \ldots \; h_{L-1}^{q-1} \; h_0^0]$$
$$[h_1^{q-1} \; h_2^{q-1} \; h_3^{q-1} \; \ldots \; h_{L-1}^{q-1} \; h_0^0]^H P$$
$$= h_1^{q-1} h_1^{q-1\,H} + h_2^{q-1} h_2^{q-1\,H} + \ldots +$$
$$h_{L-1}^{q-1} h_{L-1}^{q-1\,H} + h_0^0 h_0^{0H} - P^T h_1^{q-1} h_1^{q-1\,H} P -$$
$$P^T h_2^{q-1} h_2^{q-1\,H} P - \ldots -$$
$$P^T h_{L-1}^{q-1} h_{L-1}^{q-1\,H} P - P^T h_0^0 h_0^{0H} P$$

The following Formula 23 can be deduced from Formula 22.

$$P^T h_1^{q-1} h_1^{q-1\,H} P = 0 \quad \text{Formula 23}$$
$$P^T h_2^{q-1} h_2^{q-1\,H} P = h_1^{q-1} h_1^{q-1\,H}$$
$$\vdots \qquad \vdots$$
$$P^T h_{L-1}^{q-1} h_{L-1}^{q-1\,H} P = h_{L-2}^{q-1} h_{L-2}^{q-1\,H}$$
$$P^T h_0^0 h_0^{0H} P = h_{L-1}^{q-1} h_{L-1}^{q-1\,H}$$

Consequently, by applying Formula 23, only $\underline{h}_0^0 \underline{h}_0^{0H}$ remains in Formula 22.

When equal gain combining is performed on the results obtained by Formulae 17 and 18 as defined in Formula 19, it is possible to estimate $h_{00} h_0^{0H}$ and also reduce a caused error.

Here, in order to obtain $\overline{h}$ from the result (rank-one matrix) of Formula 19, singular value decomposition (SVD) is performed.

More specifically, the matrix of Formula 19 is a square matrix and a Hermitian matrix at the same time, and thus has one main (large) singular value and other values of 0. Therefore, when an iterative SVD algorithm, e.g., Jocobi SVD, is used, a singular vector corresponding to the largest singular value can be obtained by only 1 or 2 iterations.

The obtained singular vector becomes $\hat{h}$.

The vagueness of a phase in $\hat{h}$ obtained in this manner can be eliminated using the differential modulation method or one pilot carrier at a transmitting end.

The first of the above-described two methods estimates channel impulse response by Formulae 11 to 15 when Formula 16 is satisfied. In addition, the method according to Formulae 11 and 12 must be used when only $h_0$ satisfies Formula 16, and the method according to Formulae 13 and 14 must be used when only $h_{q-1}$ satisfies Formula 16.

On the contrary, when any of the above-mentioned conditions is not satisfied, the first method cannot be used.

In addition, the second method can reduce complexity and stably estimate a channel with high accuracy.

As described above, a method for blind channel estimation using a guard interval of a signal in an OFDM technique according to the present invention does not require any change in conventional OFDM transmitters. The proposed methods are low-complexity blind channel estimation algorithms that can be applied to actual systems, do not affect channel zero, and are stable. Also, the methods can be modified into semi-blind methods.

In addition, the SVD of a rank-one matrix has low complexity in practical application and thus can be used for actual blind channel estimation.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method of using an orthogonal frequency division multiplexing (OFDM) system for blind channel estimation, comprising the steps of:
   (a) generating an i-th symbol block $S_i$ including N carriers;
   (b) using the OFDM system for performing an inverse fast Fourier transform (IFFT) operation on the i-th symbol block and forming an OFDM symbol block;
   (c) attaching a guard interval sample in front of the i-th OFDM symbol block $U_i$ and forming at least one OFDM symbol block $U_{i,cp}$; and (d) modeling the formed OFDM symbol block $U_{i,cp}$ with a channel finite impulse response (FIR) filter h and noise v, and estimating channel impulse response using signals $y_i$ received through a channel, wherein N and i are non-zero positive integers, and wherein the signals $y_i$ received in step (d) are defined by the following:

$$\underline{y_i} = H[\underline{u}^T_{i-1,q-1} \underline{u}^T_{i,cp}]^T + \underline{v_i},$$

wherein H is a channel matrix, $u_{i-1,q-1}$ is a signal of a (q−1)th sub-block of an (i−1)th transmission block, and $v_i$ is an i-th block noise signal vector.

2. The method of claim 1, wherein step (b) is performed by the following:

$$\underline{u_i} = [u_i(0), \ldots, u_i(N-1)]^T = F_N^H \underline{s_i},$$

wherein $F_N$ is an N-point fast Fourier transform (FFT) matrix and $u_i$ is a time-domain signal.

3. The method of claim 1, wherein in step (c), P (=L+N) number of OFDM symbol blocks $U_{i,cp}$ are formed, and p=qL and N=(q−1)L, wherein q is the total number of sub-blocks and is a positive integer larger than 2, and L is the length of each sub-block and is a non-zero positive integer.

4. The method of claim 1, wherein the channel matrix H is an upper or lower triangular Toeplitz matrix having a size of P×(P+L), wherein P is the number of OFDM symbol blocks $U_{i,cp}$ and L is the length of each sub-block.

5. The method of claim 1, wherein the guard interval is a vector having a length of 2 L and defined by signals generated by the following:

$$\underline{g_{i,0}(0)} = [\underline{u}^T_{i-1,q-1} \underline{u}^T_{i,0}]^T$$

$$\underline{g_{i,0}(L-1)} = [u_{i-1,q-1}(L-1) \underline{u}^T_{i,0} u_{i,1}(0) \ldots u_{i,1}(L-2)]^T$$

$$\underline{g_{i,q-1}(0)} = [\underline{u}^T_{i,q-2} \underline{u}^T_{i,q-1}]^T$$

$$\underline{g_{i,q-1}(L-1)} = [u_{i,q-2}(L-1) \underline{u}^T_{i,q-1} u_{i+1,0}(0) \ldots u_{i+1,0}(L-2)]^T$$

6. The method of claim 5, wherein in step (d), the signals generated pass through the channel and are defined by the following:

$$\underline{y_{i,0}(d)} = [H_2 H_1] \underline{g_{i,0}(d)} + [v_i(d) \ldots v_i(d+L-1)]^T$$

$$\underline{y_{i,q-1}(d)} = [H_2 H_1] \underline{g_{i,q-1}(d)} + [v_i((q-1)L+d) \ldots v_i(qL-1+d)]^T$$

and the channel impulse response is estimated.

7. The method of claim 6, wherein the estimation of the channel impulse response is made by a cross-correlation matrix obtained by performing cross-correlation on the signals, $y_{i,0}$ and $y_{i,q-1}$.

8. The method of claim 7, wherein the cross-correlation matrix $R_0$ is obtained using the following:

$$R_0 = E\{y_{i,0}(0) y_{i,q-1}(0)^H\}$$
$$= H_1 E\{u_{i,0} u_{i,q-1}^H\} H_1^H$$
$$= H_1 H_1^H.$$

9. The method of claim 7, wherein the cross-correlation matrix $R_{q-1}$ is obtained using the following:

$$R_{q-1} = E\{y_{i,0}(L-1) y_{i,q-1}(L-1)^H\}$$
$$= [H_2 P\ H_1 \underline{e_1}] E\{u_{i,0} u_{i,q-1}^H\} [H_2 P\ H_1 \underline{e_1}]^H,$$

wherein P is a left shifting matrix having a size L×L, and $e_1$ is a unit column vector having a length of L.

10. The method of claim 9, wherein the unit column vector has a first element that is 1 and other elements that are all 0.

11. The method of claim 1, wherein step (d) comprises the steps of:

(d1) calculating cross-correlations on the signals yi received through the channel;

(d2) performing equal gain combining on the calculated cross-correlations and detecting at least two singular vectors by a rank-one matrix;

(d3) performing a singular value decomposition (SVD) on the obtained rank-one matrix and detecting a largest singular vector; and (d4) identifying a phase using a differential modulation method or one pilot carrier on the detected unit vector and estimating the channel impulse response.

12. The method of claim 11, wherein in step (d1), the cross-correlations are calculated using the following:

$$R_0 \approx \frac{1}{B} \sum_{i=0}^{B-1} y_{i,0}(0) y_{i,q-1}(0)^H$$

$$R_{q-1} \approx \frac{1}{B} \sum_{i=0}^{B-1} y_{i,0}(L-1) y_{i,q-1}(L-1)^H$$

wherein B is the number of symbol blocks having a length of L.

13. The method of claim 11, wherein in step (d2), the rank-one matrix H is obtained using the following:

$$\hat{h}\hat{h}^H = \frac{R_{0,h} + R_{q-1,h}}{2},$$

wherein $$R_{0,h} = R_0 - P R_0 P^T \text{ and } R_{q-1,h} = R_{q-1} - P^T R_{q-1} P.$$

14. The method of claim 11, wherein step (d2) comprises the steps of:

directly calculating a first estimated singular vector from a first column of a matrix $R_0$ of the calculated cross-correlations; and directly calculating a second estimated singular vector from a last row of a matrix $R_{q-1}$ of the calculated cross-correlations.

15. The method of claim 14, wherein the first estimated unit vector $\hat{h}_1$ is calculated by the following:

1st of column of $$R_0 = r_1 = ([h_0\ h_1\ \ldots\ h_{L-1}] h_0^*)^T \text{ and}$$

$$\hat{h}_1 = \frac{r_1}{\sqrt{\text{first element of } \overline{r_1}}}.$$

16. The method of claim 14, wherein the second estimated unit vector $\hat{h}_2$ is calculated by the following:

last row of $$R_{q-1} = \overline{r_L} = h_{L-1}[h_0^* \ h_1^* \ \ldots \ h_{L-1}^*] \text{ and}$$

$$\hat{h}_2 = \left(\frac{\overline{r_L}}{\sqrt{\text{last element of } \overline{r_L}}}\right)^H.$$

17. The method of claim 15 or 16, wherein when $h_0$, $h_{q-1}$ satisfies $h_0, h_{q-1} \neq 0$ and $h_0, h_{q-1} \gg 0$, the equal gain combining is performed by the following:

$$\hat{h} = \frac{\hat{h}_1 + \hat{h}_2}{2} = \left(\frac{\frac{h_0^*}{|h_0|} + \frac{h_{L-1}^*}{|h_{L-1}|}}{2}\right)[h_0 \ h_1 \ \ldots \ h_{L-1}].$$

18. The method of claim 11, wherein in step (d3), the largest singular vector is detected by at least two iterations of an SVD algorithm.

19. The method of claim 1, wherein step (d) comprises the steps of:
calculating cross-correlations on the signals yi received through the channel;
detecting a singular vector by a lower Toeplitz matrix obtained by performing Cholesky factorization on the calculated cross-correlations; and
identifying a phase using a differential modulation method or one pilot carrier on the detected unit vector and estimating the channel impulse response.

* * * * *